United States Patent [19]

Weber et al.

[11] 4,202,870

[45] May 13, 1980

[54] PROCESS FOR PRODUCING ALUMINA

[75] Inventors: Willis W. Weber, South Salem; Alexander J. Caglione, Nyack; Albert C. Frost, Congers, all of N.Y.; Thomas J. Weeks, Jr., Columbus, Ohio

[73] Assignee: Union Carbide Corporation, New York, N.Y.

[21] Appl. No.: 32,641

[22] Filed: Apr. 23, 1979

[51] Int. Cl.$^2$ ............................................. C01F 7/02
[52] U.S. Cl. ...................................... 423/630; 568/840
[58] Field of Search ...................... 423/625, 628, 630; 568/840

[56] References Cited

U.S. PATENT DOCUMENTS

| 2,636,865 | 4/1953 | Kimberlin et al. . | |
| 2,749,216 | 2/1956 | Dinuerddie et al. | 423/630 |
| 2,776,188 | 1/1957 | Gilbert | 423/630 |
| 3,384,458 | 5/1968 | McCarthy et al. . | |
| 3,394,990 | 2/1968 | Weingeartmer et al. | 423/630 |
| 3,419,352 | 12/1968 | Acciarri . | |
| 3,773,691 | 11/1973 | Leach | 423/630 |

FOREIGN PATENT DOCUMENTS

| 160696 | 1/1955 | Australia | 423/630 |
| 38-11602 | 7/1963 | Japan | 423/630 |

*Primary Examiner*—Herbert T. Carter
*Attorney, Agent, or Firm*—Richard G. Miller

[57] ABSTRACT

Alumina is produced by the hydrolysis of aluminum alkoxide in a continuous process in which the hydrolysis reaction, the aging of hydrated alumina product and the stripping of occluded by-product alcohol from the alumina particles is accomplished in the same reaction vessel.

4 Claims, 1 Drawing Figure

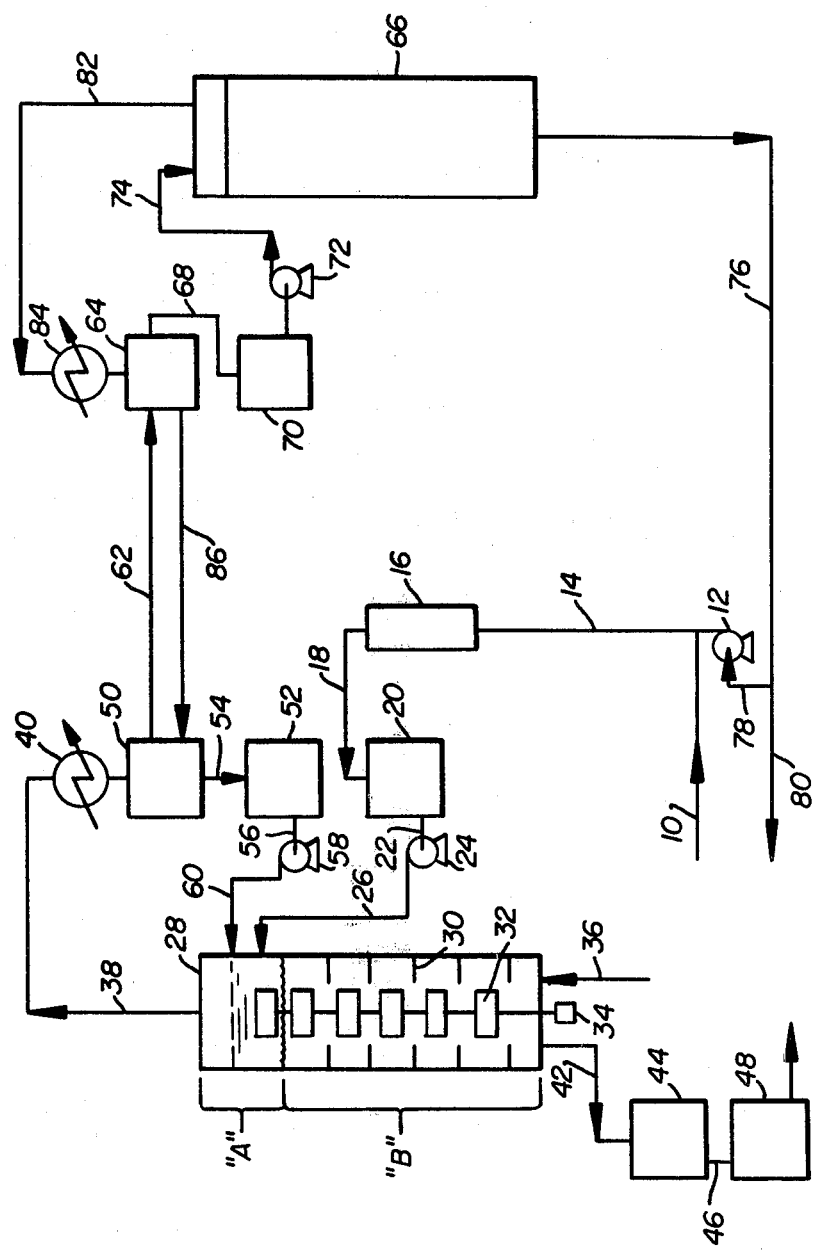

PROCESS FOR PRODUCING ALUMINA

The present process relates generally to the preparation of alumina and more particularly, to the preparation of alumina by the hydrolysis of an aluminum alkoxide.

The hydrolysis of an aluminum alkoxide to form a hydrous alumina and an alcohol is well known in the art. The stoichiometric reaction is represented by the equation:

$$2Al(OR)_3 + 4H_2O \rightarrow Al_2O_3 \cdot H_2O + 6ROH,$$

wherein R represents the alkyl radical of the starting alkoxide. It is essential to the economics of the overall process to recover the large quantities of alcohol by-product as well as the desired alumina product. Commonly, the by-product alcohol is dehydrated and used in an adjacent facility to produce more aluminum alkoxide for use in the hydrolysis reaction. It is also an important consideration that the process be sufficiently versatile to provide variable alumina product residence time prior to removal from the reaction system in order to control the surface area of the alumina to requirement specifications. At the elevated temperatures of the process, the alumina decreases in surface area fairly rapidly, and to obtain high surface areas it is sometimes necessary to withdraw the alumina product quickly from the reactor and quench it to prevent undue particle agglomeration. Further, relatively minor changes in pH conditions and temperature can cause changes in the structural type of alumina produced. For example, when the pH of the reaction mixture is less than 7, a reaction mixture temperature of greater than 80° C. results in the production of boehmite, whereas temperatures below 80° C. favor the formation of gibbsite. On the other hand, if the pH is above 7 and the temperature less than 80° C., the formation of bayerite is favored. Thus, although the hydrolysis reaction is readily carried out in the required manner to obtain the desired product on a laboratory scale, it is found that the foregoing factors present formidable difficulties in scaling up to commercial scale operation.

It is, therefore, the general object of the present invention to provide a process for the hydrolysis of aluminum alkoxide to produce alumina which is highly reproducible on a commercial scale and which is efficient and economical in separating the alcohol by-product from the alumina product.

This and other objects which will be obvious from the specification are accomplished in accordance with the present invention by the process which comprises:

(a) providing in a reactor a reaction system comprising two substantially immiscible liquid phases, the first liquid phase being water and the second liquid phase being a solution of Al(OR)$_3$ in ROH wherein "R" is an alkyl radical containing sufficient carbon atoms to render the ROH compound containing same substantially immiscible with water at 25° C. and one atmosphere, preferably from 5 to 10 carbon atoms;

(b) heating said reaction system to a temperature at least as high as the azeotropic temperature, at one atmosphere pressure, of water and the ROH constituent thereof having the lowest boiling point, preferably in the range of 189°–500° F., and most preferably in the range of 205°–370° F;

(c) bubbling steam upward through said reaction system whereby Al(OR)$_3$ is hydrolyzed to form particles of hydrated alumina and ROH as a by-product;

(d) withdrawing overhead from the reactor an azeotropic mixture of water and ROH;

(e) passing the said particles of hydrated alumina downwardly through the reactor as an aqueous slurry countercurrently to the flow of steam bubbles for a period of time sufficient to strip occluded alcohol therefrom;

(f) removing the substantially alcohol-free alumina particles from the reactor as a slurry in a portion of the water in said reactor; and (g) introducing additional water, Al(OR)$_3$ and ROH into said reaction system under conditions which maintain essentially a steady state in said reactor.

The particular aluminum alkoxide and alcohol solvent employed in the present process are not narrowly critical factors. The capability of being hydrolyzed to form an alumina product is a characteristic of the generic class of aluminum alkoxides. Al(OR)$_3$ compounds in which the "R" groups contain from 1 up to 20 or more carbon atoms have heretofore been suitably employed in the production of aluminas by hydrolysis reactions. It is important in the present process, however, to use an aluminum alkoxide which upon hydrolysis produces a by-product alcohol which is substantially immiscible with water. This alcohol is removed from the reaction system as an azeotrope with water, and it is essential for economic considerations that the alcohol of the condensed azeotrope be separable from the water with a minimum expenditure of thermal energy. Most commonly, the dehydrated alcohol by-product is reacted with aluminum metal to produce more alkoxide, but in any event, most commercial applications require a substantially anhydrous alcohol. A condensed water-alcohol azeotrope which can largely be separated into its constituents by simple decantation is most economically dealt with. Since even the primary monohydric alcohol of the class of alcohols containing 5 carbon atoms, i.e. n-pentanol, is substantially immiscible with water, it is preferred that "R" in the Al(OR)$_3$ reagent and the ROH solvent contains at least 5 carbon atoms. It will be understood that not all the alkyl groups of the alkoxide need have the same number of carbon atoms, but control of the operating conditions of the process is somewhat easier if a single Al(OR)$_3$ species is employed in which all of the "R" groups have the same number of carbon atoms.

It is also preferred that the alkyl groups of the Al(OR)$_3$ and the ROH solvent are the same and contain at least 5 carbon atoms, but not more than 10 carbon atoms. As a general proposition, the higher the carbon number of the alcohol constituent of a water-alcohol azeotrope, the leaner it is with respect to alcohol content. Accordingly, the higher the carbon number of the alcohol, the more steam required to distill the azeotrope out of the reaction system and to dehydrate the distillate with a consequent increase in cost. In the case of alcohols containing more than 10 carbon atoms, these cost considerations become a major factor in efficient practice of the process of this invention.

In those instances in which the alumina product is to be used for catalytic purposes, it is commonly mandatory that impurity elements be avoided to the highest practical degree. Since the alkoxide reagent is economically produced only from aluminum metals which are substantially impure, it is usually necessary to treat the Al(OR)$_3$ reagent to some purification procedure prior to the hydrolysis reaction. Such prior proposed purification methods include the addition of miscible hydrocarbons to cause deposition of impurities followed by decantation/filtration, and vacuum distillation, all of which are relatively costly and inefficient—the latter being due to the fact that volatile metals are not prevented from being carried over into the material involved in the hydrolysis reaction. Although these methods can be used to pretreat impure Al(OR)$_3$ before introduction thereof into the hydrolysis reaction, it is found that significant improvements in product purity are obtained if the available impure Al(OR)$_3$, in the form of an alcoholic solution, is subjected to ultrafiltration as a means of prehydrolysis purification.

Ultrafiltration, or cross-flow filtration as it is sometimes called, is carried out on liquid systems by passing same at elevated pressures through a bed of very fine particles uniformly dispersed on a porous substrate. This filter medium rejects the passage of particles and even molecules whose dimensions exceed the openings between adjacent particles on the porous bed. The particles can be prepared from a variety of materials such as diatomaceous earth, perlite, asbestos, cellulose fibers, silica gel, metal oxides and carbon. A particularly effective ultrafiltration apparatus and the method for its operation are set forth in detail in U.S. Pat. No. 3.977,967, issued Aug. 31, 1976 to O.C. Trulson et al., and incorporated herein by reference. Other procedures and apparatus are disclosed in U.S. Pat. Nos. 3,413,219; 3,449,245 and 3,537,988. A typical ultrafiltration device of the above-identified Trulson et al. disclosure employs a permeable inorganic membrane; usually zirconium oxide, deposited on the inside of carbon tubes. The metal oxide particles which form the ultrafiltration membrane or layer are from 0.01 to 10 micrometers. Feed liquor enters at one end and is pumped through the tubes in the module. Water, miscible materials and dissolved ions are forced at right angles through the filtration layer and the walls of the porous tube to produce the clear "ultrafiltrate." The concentrated impurity residue, or sludge, of particulate matter is drawn off at the other end of the tube. The unit typically reduces the concentration of trace metals existing in the feed from, for example, about 2000 ppm iron to 20 ppm in the permeate (effluent); or from about 400 ppm copper to about 30 ppm in the permeate. Another feature of this unit is that it permits operation at elevated temperatures, on the order of 80° to 125° C., thus advantageously giving permeates of reduced viscosities to be thereafter supplied to the reactor. Also since heated feeds are used, the permeate is returned to the processing line at temperatures close to that of the feed, resulting in significant heat energy savings.

Because the solvent alcohol, ROH, employed in the present process is substantially immiscible with water and is less dense than water, the reaction system tends to be segregated into two layers with the alcohol on the top and water on the bottom. The Al(OR)$_3$ dissolved in the alcohol solvent reacts very readily with the water to form alumina particles which initially are amorphous and extremely small, but quickly coalesce into larger crystallites and form an aqueous slurry. By the addition of water to the upper portion of the reactor and the removal of the aqueous slurry of alumina from the lower portion of the reactor, the movement of the alumina particles through the reactor is caused to be countercurrent to the upward flow of steam bubbles which are introduced through the bottom or lower portion of the reactor. This countercurrent movement results in highly efficient stripping of the alcohol which is occluded on the alumina particles and produces an effluent slurry of alumina which need not be further treated. In addition to serving as a stripping agent, the steam bubbles impart thermal energy to the reaction system and are the moving force which carries the azetropic wateralcohol mixture out of the reactor as the first step of recovering the by-product alcohol.

The water-alcohol azeotrope that is condensed outside the reactor readily separates into an alcohol and a water phase and is separated by decantation. The water phase containing some dissolved alcohol is available for immediate return to the reactor. The alcohol phase which contains some water is further distilled to recover dry alcohol and an azeotrope which is again decanted and the alcohol phase redistilled. A portion of the dry alcohol is available to serve as a solvent for the Al(OR)$_3$ feed to the reactor and the remainder is removed from the system as a commercial product.

The alumina slurry can, if desired, be aged at somewhat elevated temperatures to increase the particle size and decrease the surface area. If a solid product is desired, the slurry can be filtered or subjected to some other well-known treatment to recover the alumina as a dry solid.

As will be apparent to those skilled in the art, the volume of alcoholic solution of alkoxide is not at all critical either with respect to the relative proportions of alcohol and alkoxide in the solution thereof or with respect to the volume of water employed. The volume of water should be correlated with the feed and effluent rates of the various components of the reaction system such that the residence time of the alumina slurry in the reactor is sufficient to achieve the desired degree of alcohol stripping and solids content and to permit the alumina particles to attain the desired size.

The invention can be more completely understood by reference to the drawing and the following examples.

Example 1

With reference to the drawing, a feed mixture is prepared by admixing aluminum tri-(n-amylate) with n-pentanol. The former contains 2 lb/hr miscellaneous impurities and is introduced into the process apparatus through line 10. The alcohol contains 1 lb/hr residual water and is passed through pump 12 into line 14 wherein it is admixed with the alkoxide. The mixture is then fed at a temperature of 125° C. to ultrafiltration unit 16 having a capacity of 0.6 gal. per minute and operating at 125° C. and 60 psi. The feed rates of the alkoxide and alcohol are 772 and 756 lb/hr respectively. The purified permeate discharged from ultrafiltration unit 16 consists of 760 lb/hr alcohol and 760 lb/hr alkoxide. This permeate flows through line 18 to holding tank 20 whence through line 22, pump 24 and line 26 into hydrolysis reaction section "A" of reactor 28. The reactor is essentially cylindrical in configuration and is provided with baffles represented by 30 and agitating means 32 comprising a number of paddles rotated by motor 34. The lower portion of the reactor contain water as the principal liquid component and constitutes the slurry stripping section "B" of the reactor. Steam is fed into the bottom of the reactor into the slurry stripping section through line 36 at a temperature of about 185° C. and at a pressure of approximately 150 psig and at the rate of about 1,675 pounds per hour. At steady state conditions, the temperature in the reactor ranges from about 186° C. near the bottom close to the steam inlet to about 175° C. in the hydrolysis reaction section "A" at the top. The bubbles of steam rising through the reactor provide heat to maintain the temperature and also provides agitation in the reaction system. As the steam passes through the alcoholic alkoxide in the hydrolysis reaction section, alkoxide is converted to hydrated alumina and by-product alcohol. The alcohol is constantly being steam distilled and leaves the reactor as an azeotropic mixture with water, at the rate of 1,347 lb/hr of water and 1,477 lb/hr of alcohol, through line 38 and is condensed in condenser 40. The hydrated alumina particles descend as a slurry through the reactor and are simultaneously stripped of occluded alcohol and aged. A slurry of alumina in water containing 9.1 wt.-% $Al_2O_3 \cdot H_2O$ is withdrawn through line 42 to holding tank 44 at the rate of 1,739 pounds per hour. The slurry is allowed to stand quietly for one hour at 150° C., transferred to a storage container 48 through line 46 wherein it is held for 24 hours at ambient room temperature, and then discharged through line 50 for filtration and drying. The product after drying at 100° C. has the characteristic X-ray diffraction pattern of well-crystallized boehmite and has a surface area of 330 $m^2/g$. The chemical composition (anhydrous basis) is:

|  | Wt.-% |
| --- | --- |
| $Al_2O_3$ | 99.96 |
| $SiO_2$ | 0.02 |
| $Na_2O$ | 0.001 |
| $Fe_2O_3$ | 0.003 |
| $SO_4$ | 0.005 |

The condensate alcohol-water mixture from condenser 40 is discharged into holding tank 50 where it forms two separate immiscible liquid phases; the lighter alcohol forming the upper phase. The water phase containing a small amount of alcohol is fed to tank 52 though line 54 whence an aqueous stream consisting of 1,345 lb/hr water and 23 lb/hr alcohol is fed to the reactor through line 56, pump 58 and line 60. The alcohol phase containing about 3 wt.-% water is passed from tank 50 through line 62 to holding tank 64 wherein it is admixed with condensate from distillation column 66. Feed to distillation column 66, which serves to dry the by-product alcohol, is drawn from the alcohol layer of tank 64 through line 68, holding tank 70, pump 72 and line 74. The feed stream contains approximately 25 mole percent water and 75 mole percent alcohol. Dry alcohol is passed through line 76 and after a portion is removed through line 78 and pump 12 for admixture with Al(OR)$_3$ entering the system, the remainder is withdrawn from the system through line 80. The overhead distilled mixture of water and alcohol is passed throug line 82 to condenser 84 and deposited into tank 64 where it forms two immiscible layers. The water layer is withdrawn and returned through line 86 to tank 50 to complete the cycle.

What is claimed is:

1. Process for the preparation of alumina by the hydrolysis of an aluminum alkoxide which comprises
   (a) providing in a reactor a reaction system comprising two substantially immiscible liquid phases, the first liquid phase being water and the second liquid phase being a solution of Al(OR)$_3$ in ROH wherein "R" is an alkyl radical containing sufficient carbon atoms to render the ROH compound containing same substantially immiscible with water at 25° C. and one atmosphere;
   (b) heating said reaction system to a temperature at least as high as the azeotropic temperature, at one atmosphere pressure, of water and the ROH constituent thereof having the lowest boiling point;
   (c) bubbling steam upward through said reaction system whereby Al(OR)$_3$ is hydrolyzed to form particles of hydrated alumina and ROH as a by-product;
   (d) withdrawing overhead from the reactor an azeotropic mixture of water and ROH;
   (e) passing the said particles of hydrated alumina downwardly through the reactor as an aqueous slurry countercurrently to the flow of steam bubbles for a period of time sufficient to strip occluded alcohol therefrom;
   (f) removing the substantially alcohol-free alumina particles from the reactor as a slurry in a portion of the water in said reactor; and
   (g) introducing additional water, Al(OR)$_3$ and ROH into said reaction system under conditions which maintain essentially a steady state in said reactor.

2. Process according to claim 1 wherein the reaction system is maintained at a temperature of at least as high as the azeotropic temperature at one atmosphere pressure of water and the ROH constituent, but not greater than 370° F.

3. Process according to claim 2 wherein ROH is n-pentanol.

4. Process according to claim 1 wherein the azeotropic mixture of water and ROH withdrawn from the reactor in step (d) thereof is condensed to form a two phase liquid system, separated by decantation and at least a portion of each phase returned to the reaction system in step (g) thereof.

* * * * *